(12) United States Patent
Becheret

(10) Patent No.: US 11,530,934 B2
(45) Date of Patent: Dec. 20, 2022

(54) DOUBLY FILTERED NAVIGATION METHOD

(71) Applicant: SAFRAN ELECTRONICS & DEFENSE, Paris (FR)

(72) Inventor: Yves Becheret, Moissy-Cramayel (FR)

(73) Assignee: SAFRAN ELECTRONICS & DEFENSE, Paris (FR)

( * ) Notice: Subject to any disclaimer, the term of this patent is extended or adjusted under 35 U.S.C. 154(b) by 0 days.

(21) Appl. No.: 17/608,339

(22) PCT Filed: Apr. 23, 2020

(86) PCT No.: PCT/EP2020/061392
§ 371 (c)(1),
(2) Date: Nov. 2, 2021

(87) PCT Pub. No.: WO2020/224984
PCT Pub. Date: Nov. 12, 2020

(65) Prior Publication Data
US 2022/0146281 A1  May 12, 2022

(30) Foreign Application Priority Data
May 3, 2019  (FR) .................... 19 04691

(51) Int. Cl.
*G01C 25/00* (2006.01)
*G01C 21/16* (2006.01)
*G01S 19/49* (2010.01)

(52) U.S. Cl.
CPC ........... *G01C 25/00* (2013.01); *G01C 21/165* (2013.01); *G01S 19/49* (2013.01)

(58) Field of Classification Search
USPC ....................................................... 701/468
See application file for complete search history.

(56) References Cited

U.S. PATENT DOCUMENTS

2001/0020216 A1    9/2001  Lin
2005/0114023 A1*   5/2005  Williamson ........... G05D 1/104
                                                701/472
2021/0063160 A1*   3/2021  Lam ..................... G01C 21/165

FOREIGN PATENT DOCUMENTS

EP            2172744 A2    4/2010

* cited by examiner

*Primary Examiner* — Tyler D Paige
(74) *Attorney, Agent, or Firm* — Muncy, Geissler, Olds & Lowe, P.C.

(57) ABSTRACT

A method of navigating a vehicle (A) by means of a navigation algorithm arranged to determine spatial information (p(xr, yr, zr), v, a(Θxr, Θyr, Θzr), PL) on the basis firstly of inertial measurements (Mi) coming from a signal processor circuit (100) for processing the signals from an inertial measurement unit (I) and secondly of pseudo-distance measurements (Mpd) determined in response to receiving signals from positioning satellites, the measurement processor circuit (100) having a calibration input adjustable on a self-calibration value (VCal) in order to reduce the influence of an error of the inertial measurement unit (I) on the spatial information (p(xr, yr, zr), v, a(Θxr, Θyr, Θzr), PL) supplied by the navigation algorithm. The navigation algorithm makes use of at least: a Kalman-Schmidt filter (400) arranged to detect faulty measurements among the measurements and to prevent them from being used in determining the spatial information (p(xr, yr, zr), v, a(Θxr, Θyr, Θzr), PL), a Kalman filter (500) that is set to supply at least one estimate (E) of at least one error affecting the inertial measurement unit (I) and covariance (Cov) associated with said estimate, and a consolidation algorithm (600) pro- (Continued)

grammed to compare the covariance with a first covariance threshold and to store the estimate if the covariance is less than the first covariance threshold in order to update the self-calibration value by means of the estimate of the error of the inertial measurement unit.

11 Claims, 1 Drawing Sheet

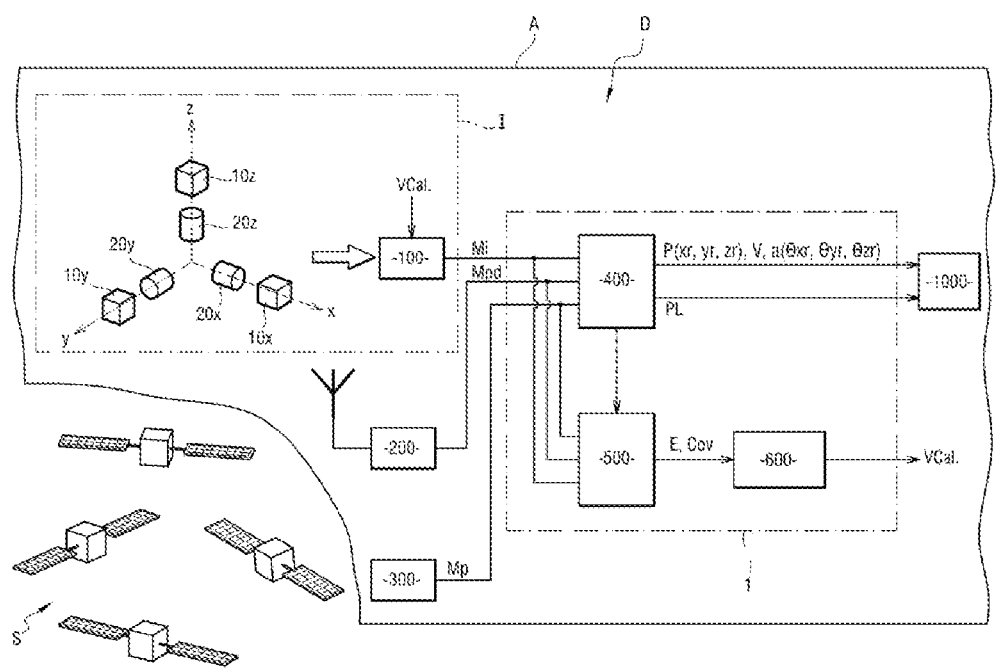

DOUBLY FILTERED NAVIGATION METHOD

The present invention relates to the field of inertial measurement, more particularly for navigation purposes.

TECHNOLOGICAL BACKGROUND

Vehicle navigation is usually performed by means of a navigation algorithm arranged to determine spatial location and orientation information (position, speed, attitude information) and also horizontal and vertical position protection limits, on the basis firstly of inertial measurements coming from a signal processor circuit of an inertial measurement unit and secondly of pseudo-distance measurements determined on the basis of receiving positioning satellite signals and optionally barometric altitude or depth signals. The inertial measurement unit conventionally comprises accelerometers arranged on the axes of a measurement reference frame and gyros arranged to measure rotation of the measurement reference frame relative to an inertial reference frame.

On their own, the signals coming from the inertial measurement unit serve to maintain spatial information comprising the position, the speed, and the attitude of the vehicle. Navigation on the basis purely of inertial spatial information is accurate in the relatively short term, but it tends to drift in the relatively long term.

On their own, pseudo-distance measurements serve to determine spatial information comprising the position and the speed of the vehicle, or more precisely of its reception antenna. Since navigation on the basis purely of satellite spatial information is accurate in the relatively long term, the navigation algorithm generally includes a Kalman filter arranged to make use both of the signals from the inertial measurement unit and also the pseudo-distance measurements (this is commonly referred to as "hybridizing"). Usually, the Kalman filter estimates certain errors of the inertial sensors of the inertial measurement unit (IMU) in order to improve the accuracy of navigation, more particularly during cabotage or "coasting". On the basis of these estimated errors, the Kalman filter determines a self-calibration value that is used for adjusting a calibration input of the circuit for processing the signals from the inertial measurement unit in order to reduce the influence of an error of the inertial measurement unit on the spatial information supplied by the navigation algorithm.

This gives rise to a navigation method that is relatively accurate, except when one of the satellites from which the signal has been used is faulty. Specifically, under such circumstances, the Kalman filter produces a self-calibration value that is erroneous and that degrades the accuracy of navigation instead of improving it.

OBJECT OF THE INVENTION

An object of the invention is to provide means for improving the accuracy of hybrid navigation while remaining independent of that navigation.

BRIEF SUMMARY OF THE INVENTION

To this end, the invention provides a method of navigating a vehicle by means of a navigation algorithm arranged to determine spatial information on the basis firstly of inertial measurements coming from a signal processor circuit for processing the signals from an inertial measurement unit and secondly of pseudo-distance measurements determined in response to receiving signals from positioning satellites, the signal processor circuit having a calibration input adjustable on a self-calibration value in order to reduce the influence of an error of the inertial measurement unit on the spatial information supplied by the navigation algorithm.

The navigation algorithm makes use of a set of filters that are Kalman-Schmidt filters arranged to detect faulty measurements among the pseudo-distance measurements that are transmitted to the set of filters and to prevent them from being used in determining the spatial information.

The method comprises the steps of:
when a journey is completed:
   transmitting the inertial measurements and the pseudo-distance measurements to a hybrid navigation filter that is dedicated to self-calibration and that uses a Kalman filter that is set to supply at least one estimate of at least one error term affecting the inertial measurement unit and of covariance associated with said estimate;
   transmitting each estimate and the associated covariance to a consolidation algorithm programmed to compare the covariance with a first covariance threshold and to store the estimate if the covariance is less than the first covariance threshold; and
   storing at least one parameter representative of a utilization condition of the aircraft; and
after the journey has been completed:
   using the consolidation algorithm to verify that the utilization condition is nominal, and where appropriate, updating the self-calibration value by means of the estimate of the error of the inertial measurement unit; and
   calibrating the inertial measurement unit by using the updated self-calibration value.

Thus, the estimates of the errors are taken into account when determining the self-calibration value only if the covariances that are associated therewith are below a threshold. This limits the risk that taking account of measurements coming from a faulty sensor could falsify determining the self-calibration value. Furthermore, since the self-calibration is performed for the journey that is to follow the current journey during which the estimate of the error was determined, it is important to ensure that the most recent journey took place under nominal conditions and that the estimate of the error used for determining the self-calibration value is representative of the conditions of use for the future journey.

Advantageously, the measurements that are identified as faulty are excluded from the measurements transmitted to the hybrid navigation filter.

This serves to further improve the reliability with which the self-calibration value is determined.

Also advantageously, only a fraction of the estimate, preferably about one twentieth, is used to update the self-calibration value.

Even assuming that a faulty measurement and/or a measurement that has been influenced by non-nominal conditions of utilization is taken into account when estimating the errors of the sensors, the influence of the measurement on self-calibration is diminished since only a fraction of the estimate of the error is used.

According to a first advantageous characteristic, if the estimate of the error is greater than a first error threshold, then the estimate of the error is set to the value of the first error threshold for updating the self-calibration value.

The value of the first error threshold may be determined to correspond to the estimated maximum error under nominal conditions (determined empirically or by simulation and set in the factory). If the estimate of the error is greater than the first threshold, it is possible that a faulty measurement has been taken into account. In order to eliminate its influence, the value of the first error threshold is used as the estimate of the error when determining the updated self-calibration value.

According to a second advantageous characteristic, which may optionally be combined with the first advantageous characteristic, if the estimate of the error is greater than a second error threshold that is greater than the first error threshold, then the estimate of the error is not used for updating the self-calibration value.

The value of the second error threshold may be determined to correspond to the estimate for the maximum error that it is possible to have regardless of the utilization conditions (determined empirically or by simulation and set in the factory). If the estimate of the error is greater than this second threshold, it is very probable that a faulty measurement has been taken into account. The estimate of the error is then not used for determining the updated self-calibration value.

In an application to an aircraft, the spatial information comprises position, speed, attitude, and protection limit information, and possibly also an indication concerning any detected breakdowns.

Between the position determined by the navigation algorithm and the real position of the aircraft, there is a difference that depends on the errors of the sensors and of the satellites. In order to authorize certain stages of flight on the basis of the navigation information, e.g. flight in a gorge or at low altitude while landing, it is common practice to determine a "protection" zone (perhaps a spherical zone, a horizontal disk, or a vertical zone) that is centered on the position determined by the algorithm and within which the real position is to be found with some predetermined probability. The protection limit corresponds to the radius of the protection zone.

Preferably, the pseudo-distance measurements are transmitted to the hybrid navigation filter only if the speed of the vehicle is greater than a predetermined speed threshold.

Pseudo-distance measurements, which are not very reliable when the aircraft is on the ground because of the existence of reflections of the satellite signals on nearby buildings or aircraft (or because of multiple paths) are then not used for self-calibration.

Preferably, the pseudo-distance measurements are used by the hybrid navigation filter dedicated to self-calibration only if those measurements had been validated by a check function, e.g. of the receiver autonomous integrity monitoring (RAIM) type that is performed by the radio location receiver.

Preferably, atmospheric pressure or pressure altitude information is also transmitted to the first bank filters and to the hybrid navigation filter dedicated to self-calibration.

This barometric pressure information is used by the filters to reinforce determination of the altitude of the aircraft, in particular when the pseudo-distance information is unusable.

Advantageously, the condition for using errors estimated by the hybrid navigation filter dedicated to self-calibration is represented by at least one of the following parameters: journey time, the occurrence of a breakdown, unavailability of the satellite signals, speed, temperature, . . . .

Verifying that these parameters remain within an acceptable range makes it possible to determine whether the journey has taken place under nominal conditions, and thus to determine whether the estimate of the error terms as evaluated by the filter dedicated to self-calibration is representative of usual utilization conditions.

The invention also provides a vehicle navigation device comprising an inertial measurement unit and a receiver of signals from positioning satellites, both connected to a computer processor unit implementing a navigation algorithm arranged to determine spatial information firstly from inertial measurements coming from a signal processor circuit for processing the signals from the inertial measurement unit and secondly from pseudo-distance measurements coming from the receiver of signals from positioning satellites, the measurement processor circuit having a calibration input that is adjustable on a self-calibration value in order to reduce the influence of an error of the inertial measurement unit on the spatial information supplied by the navigation algorithm. The navigation algorithm makes use of a first set of filters that comprise Kalman-Schmidt filters and the computer processor unit is arranged to perform the method of the invention.

Other characteristics and advantages of the invention appear on reading the following description of a particular and nonlimiting implementation of the invention.

BRIEF DESCRIPTION OF THE DRAWING

Reference is made to the sole accompanying FIGURE, which is a schematic diagram of a device for implementing the method of the invention.

DETAILED DESCRIPTION OF THE INVENTION

With reference to the FIGURE, the method is described herein in its application to navigating an aircraft, given reference A, carrying a navigation device, given general reference D, that makes use both of inertial signals and also of positioning signals coming from a satellite constellation S. The device D combines an inertial positioning system and a satellite positioning system. The inertial positioning system is itself known, and the description below covers only those particular features of its structure and of its operation that are useful for describing the invention. Satellite positioning systems (also known as global navigation satellite systems (GNSS)) are themselves known under various names such as GPS, GALILEO, GLONASS, BEIDOU, and the description below covers only the particular features of its structure and of its operation that are useful for describing the invention.

The device D comprises an inertial measurement unit I, a receiver 200 for receiving positioning satellite signals, and a pressure measurement member 300 for measuring atmospheric pressure, all three of which are connected to a computer processor unit given overall reference 1.

In conventional manner, the inertial measurement unit I comprises linear inertial sensors $10x$, $10y$, and $10z$, specifically accelerometers having sensing axes positioned on the x, y, and z axes of a measurement reference frame, and angular inertial sensors $20x$, $20y$, and $20z$, specifically rate gyros positioned on the x, y, and z axes. The outputs from the inertial sensors $10x$, $10y$, $10z$, $20x$, $20y$, and $20z$ are connected to a processor circuit 100 comprising at least a processor and a memory containing a first program arranged, in known manner, to respond to the signals supplied by the inertial sensors $10x$, $10y$, $10z$, $20x$, $20y$, and $20z$ by determining both inertial measurements Mi comprising the components along the x, y, and z axes of a specific force vector and also rotations of the measurement reference frame relative to a reference frame having axes xr, yr, and zr.

The processor circuit 100 has a calibration input adjustable on a self-calibration value VCal taken into account by the first program in order to reduce the influence of an inertial sensor error on the inertial measurements.

The receiver 200 comprises at least a processor and a memory containing a second program that is arranged, in known manner, to calculate pseudo-distance measurements Mpd from positioning satellite signals that are transmitted by the satellites of the satellite constellation S.

The pressure measurement member 300 is arranged to provide a measurement Mp of the atmospheric pressure outside of the aircraft A. The pressure measurement member 300 is itself known and is not described herein.

The computer processor unit 1 comprises at least a processor and a memory containing a third program arranged to execute a navigation algorithm arranged to determine spatial information firstly from the inertial measurements coming from the processor circuit 100, and secondly from the pseudo-distance measurements determined by the receiver 200 on the basis of the positioning satellite signals.

The navigation algorithm makes use of at least a first filter 400 and a second filter 500, both of which receive as inputs the inertial measurements Mi, the pseudo-distance measurements Mpd, and the pressure measurement Mp.

The first filter 400 is a Kalman-Schmidt filter set to:
model errors in the measurements that are supplied thereto, without estimating them;
detect faulty measurements among the measurements that have been transmitted thereto; and
determine spatial information on the basis of measurements that are considered as being not faulty.

The spatial information comprises position information p(xr, yr, zr), speed v, attitude a($\Theta$xr, $\Theta$yr, $\Theta$zr) and a protection limit PL, and it is transmitted to a pilot unit 1000 of the aircraft A to which the device D is connected.

More precisely, the first filter 400 is a bank of Kalman-Schmidt filters: one of the Kalman-Schmidt filters makes use of all of the measurements, while each of the other Kalman-Schmidt filters makes use of all of the measurements except for one, each filter being arranged to supply the spatial information on the basis of the measurements it receives as inputs. The navigation algorithm is arranged to compare the spatial information as supplied by the Kalman-Schmidt filters. Roughly speaking, and as is known to the person skilled in the art:
in the absence of any faulty measurements, the spatial information as supplied by all of the Kalman-Schmidt filters is identical; and
when one of the measurements is faulty, the spatial information supplied by the filter that excludes said measurement differs from the localization information as supplied by the other filters, thus making it possible to identify the faulty measurement.

The second filter 500 is a hybrid navigation filter, and more particularly it is a Kalman filter set in known manner to determine at least one estimate E of at least one error term affecting the inertial measurement unit I and of covariance Cov associated with said estimate.

The third program comprises instructions arranged to implement the method of the invention, which method comprises the following steps that are performed when the aircraft A has completed a journey:
transmitting the inertial measurements Mi, the pseudo-distance measurements Mpd, and the pressure measurement Mp to the first filter 400 in order to determine spatial information on the basis of the measurements that have been identified as not being faulty;
transmitting the inertial measurements Mi, the pseudo-distance measurements Mpd, and the atmospheric pressure measurement Mp to the second filter 500 in order to determine at least one estimate E of the error affecting the inertial measurement unit I and of covariance Cov associated with said estimate E;
transmitting each estimate and the associated covariance to a consolidation algorithm 600 programmed to compare the covariance with a first covariance threshold and to store the estimate if the covariance is less than the first covariance threshold s1; and
storing at least one parameter representative of a utilization condition of the aircraft A.

In the preferred implementation, the measurements that are identified as being faulty by the first filter 400 are excluded from the measurements used by the second filter 500. In the diagram, a dashed line is used to represent a link between the first filter 400 and the second filter 500 for the purpose of transmitting an indication about faulty measurements to the second filter 500.

Also, the pseudo-distance measurements Mpd are transmitted to the second filter 500 only if the speed of the aircraft A is greater than a predetermined speed threshold, which corresponds in this example the takeoff speed of the aircraft A. Since the accuracy of the pseudo-distance measurements Mpd is lower on the ground, it is decided not to take them into account when estimating errors so long as the aircraft A has not taken off. In a variant, some other parameter could be monitored in order to decide when to start taking account of the pseudo-distance measurements, such as altitude, angle of attack, or atmospheric pressure, or a combination thereof.

The value of the first covariance threshold s1 is predetermined to correspond to a desired minimum level of reliability for the error estimate.

The utilization condition is represented by at least one of the following parameters: journey time, the occurrence of a breakdown, unavailability of the satellite signals, speed, temperature, . . . . The parameters such as the journey time, the availability of the satellite signals, and speed can be determined directly within the device D. It is possible to envisage that the other parameters, such as the occurrence of a breakdown, are supplied to the processor unit 1 by sensors of the aircraft A and/or by the pilot unit 1000 to which the device D is connected.

After the aircraft A has completed a journey, the method of the invention also comprises the steps of:
using the consolidation algorithm 600 to verify that the utilization condition is nominal, and where appropriate, calculating a self-calibration value VCal updated by the consolidation algorithm 600 by means of the estimate E of the error of the inertial measurement unit I; and
causing the inertial measurement unit I to be calibrated by the processor circuit 100 using the updated self-calibration value VCal.

In the preferred implementation, only a fraction of the estimate E is used to update the self-calibration value VCal. More precisely, only one twentieth of the estimate E is used to update the self-calibration value VCal.

Also, if the estimate E of the error is greater than a first error threshold s2, the estimate E of the error is replaced by the value of the first error threshold s2 for updating the self-calibration value VCal. Thus, under such circumstances, it is one twentieth of the value of the first error threshold s2 that is used for calculating the updated self-calibration value VCal. The value of the first error threshold s2 may be determined to correspond to the estimated maximum error under nominal conditions (determined empirically and set in the factory).

Nevertheless, if the estimate E of the error is greater than a second error threshold s3 that is itself greater than the first error threshold s2, then the estimate E of the error is not used for updating the self-calibration value VCal. Under such circumstances, it can be understood that the self-calibration value VCal is left unchanged, since the estimate of the error is considered as being unreliable.

Naturally, the invention is not limited to the embodiment described, but covers any variant coming within the ambit of the invention as defined by the claims.

In particular, the device may be of any structure that enables the method of the invention to be performed. Thus, the circuit for processing the signals coming from the inertial sensors may be incorporated in the inertial unit or it may be incorporated in the processor unit 1. The pseudo-distance measurements may be calculated from the satellite signals in the satellite signal receiver or directly by the processor unit 1.

The architecture of the device may be of a conventional type that is based on processors or memories and/or it may be in the form of a programmable logic circuit or a "field programmable gate array" (FPGA).

The software structure of the invention may be different from that described, and by way of example, it could comprise only a single program or else it could comprise a master program calling on slave programs.

It is possible to do without the atmospheric pressure measurement.

Having recourse to error thresholds is advantageous, but not essential.

That measurements that are identified as being faulty by the first filter 400 need not be excluded from the measurements used by the second filter 500.

The invention claimed is:

1. A method of navigating a vehicle by means of a navigation algorithm arranged to determine spatial information on the basis firstly of inertial measurements coming from a signal processor circuit for processing the signals from an inertial measurement unit and secondly of pseudo-distance measurements determined in response to receiving signals from positioning satellites, the signal processor circuit having a calibration input adjustable on a self-calibration value in order to reduce the influence of an error of the inertial measurement unit on the spatial information supplied by the navigation algorithm, wherein the navigation algorithm implements at least one set of filters that are Kalman-Schmidt filters arranged to detect faulty measurements among the measurements that are transmitted to the set of filters and to prevent them from being used in determining the spatial information, and wherein the method comprises the steps of:
when a journey is completed:
transmitting the inertial measurements and the pseudo-distance measurements to at least one hybrid navigation filter that is a Kalman filter that is set to supply at least one estimate of at least one error term affecting the inertial measurement unit and of covariance associated with said estimate;
transmitting each estimate and the associated covariance to a consolidation algorithm programmed to compare the covariance with a first covariance threshold and to store the estimate if the covariance is less than the first covariance threshold; and
storing at least one parameter representative of a utilization condition of the aircraft; and
after the journey has been completed:
using the consolidation algorithm to verify that the utilization condition is nominal, and where appropriate, updating the self-calibration value by means of the estimate of the error of the inertial measurement unit; and
calibrating the inertial measurement unit by using the updated self-calibration value.

2. The method according to claim 1, wherein the measurements that are identified as faulty are excluded from the measurements used by the hybrid navigation filter.

3. The method according to claim 1, wherein only a fraction of the estimate is used to update the self-calibration value.

4. The method according to claim 1, wherein if the estimate of the error is greater than a first error threshold, then the estimate of the error is replaced by the value of the first error threshold for updating the self-calibration value.

5. The method according to claim 1, wherein the vehicle is an aircraft, and the spatial information comprises position, speed, attitude, and protection limit information.

6. The method according to claim 1, wherein the utilization condition is represented by at least one of the following parameters: journey time, the occurrence of a breakdown, unavailability of the satellite signals, speed, and temperature.

7. A navigation device for a vehicle, the device comprising an inertial measurement unit and a receiver of signals from positioning satellites, both connected to a computer processor unit implementing a navigation algorithm arranged to determine spatial information firstly from inertial measurements coming from a signal processor circuit for processing the signals from the inertial measurement unit and secondly from pseudo-distance measurements coming from the receiver of signals from positioning satellites, the signal processor circuit having a calibration input that is adjustable on a self-calibration value in order to reduce the influence of an error of the inertial measurement unit on the spatial information supplied by the navigation algorithm, wherein the navigation algorithm makes use of a set of filters that are Kalman-Schmidt filters, and wherein the computer processor unit is arranged to perform the method according to claim 1.

8. A method of navigating a vehicle by means of a navigation algorithm arranged to determine spatial information on the basis firstly of inertial measurements coming from a signal processor circuit for processing the signals from an inertial measurement unit and secondly of pseudo-distance measurements determined in response to receiving signals from positioning satellites, the signal processor circuit having a calibration input adjustable on a self-calibration value in order to reduce the influence of an error of the inertial measurement unit on the spatial information supplied by the navigation algorithm, wherein the navigation algorithm implements at least one set of filters that are Kalman-Schmidt filters arranged to detect faulty measurements among the measurements that are transmitted to the set of filters and to prevent them from being used in determining the spatial information, wherein the method comprises the steps of:
  when a journey is completed:
    transmitting the inertial measurements and the pseudo-distance measurements to at least one hybrid navigation filter that is a Kalman filter that is set to supply at least one estimate of at least one error term affecting the inertial measurement unit and of covariance associated with said estimate;
    transmitting each estimate and the associated covariance to a consolidation algorithm programmed to compare the covariance with a first covariance threshold and to store the estimate if the covariance is less than the first covariance threshold; and
    storing at least one parameter representative of a utilization condition of the aircraft; and
  after the journey has been completed:
    using the consolidation algorithm to verify that the utilization condition is nominal, and where appropriate, updating the self-calibration value by means of the estimate of the error of the inertial measurement unit; and
    calibrating the inertial measurement unit by using the updated self-calibration value;
wherein only one twentieth of the estimate is used to update the self-calibration value.

9. A method of navigating a vehicle by means of a navigation algorithm arranged to determine spatial information on the basis firstly of inertial measurements coming from a signal processor circuit for processing the signals from an inertial measurement unit and secondly of pseudo-distance measurements determined in response to receiving signals from positioning satellites, the signal processor circuit having a calibration input adjustable on a self-calibration value in order to reduce the influence of an error of the inertial measurement unit on the spatial information supplied by the navigation algorithm,
  wherein the navigation algorithm implements at least one set of filters that are Kalman-Schmidt filters arranged to detect faulty measurements among the measurements that are transmitted to the set of filters and to prevent them from being used in determining the spatial information,
  wherein the method comprises the steps of:
    when a journey is completed:
      transmitting the inertial measurements and the pseudo-distance measurements to at least one hybrid navigation filter that is a Kalman filter that is set to supply at least one estimate of at least one error term affecting the inertial measurement unit and of covariance associated with said estimate;
      transmitting each estimate and the associated covariance to a consolidation algorithm programmed to compare the covariance with a first covariance threshold and to store the estimate if the covariance is less than the first covariance threshold; and
      storing at least one parameter representative of a utilization condition of the aircraft; and
    after the journey has been completed:
      using the consolidation algorithm to verify that the utilization condition is nominal, and where appropriate, updating the self-calibration value by means of the estimate of the error of the inertial measurement unit; and
      calibrating the inertial measurement unit by using the updated self-calibration value,
wherein if the estimate of the error is greater than a first error threshold, then the estimate of the error is replaced by the value of the first error threshold for updating the self-calibration value, and
wherein if the estimate of the error is greater than a second error threshold that is greater than the first error threshold, then the estimate of the error is not used for updating the self-calibration value.

10. A method of navigating a vehicle by means of a navigation algorithm arranged to determine spatial information on the basis firstly of inertial measurements coming from a signal processor circuit for processing the signals from an inertial measurement unit and secondly of pseudo-distance measurements determined in response to receiving signals from positioning satellites, the signal processor circuit having a calibration input adjustable on a self-calibration value in order to reduce the influence of an error of the inertial measurement unit on the spatial information supplied by the navigation algorithm,
  wherein the navigation algorithm being implements at least one set of filters that are Kalman-Schmidt filters arranged to detect faulty measurements among the measurements that are transmitted to the set of filters and to prevent them from being used in determining the spatial information,
  wherein the method comprises the steps of:
    when a journey is completed:
      transmitting the inertial measurements and the pseudo-distance measurements to at least one hybrid navigation filter that is a Kalman filter that is set to supply at least one estimate of at least one error term affecting the inertial measurement unit and of covariance associated with said estimate;
      transmitting each estimate and the associated covariance to a consolidation algorithm programmed to compare the covariance with a first covariance threshold and to store the estimate if the covariance is less than the first covariance threshold; and
      storing at least one parameter representative of a utilization condition of the aircraft; and
    after the journey has been completed:
      using the consolidation algorithm to verify that the utilization condition is nominal, and where appropriate, updating the self-calibration value by means of the estimate of the error of the inertial measurement unit; and
      calibrating the inertial measurement unit by using the updated self-calibration value,
wherein the vehicle is an aircraft, and the spatial information comprises position, speed, attitude, and protection limit information, and
wherein the pseudo-distance measurements are transmitted to the hybrid navigation filter only if the speed of the vehicle is greater than a predetermined speed threshold.

11. A method of navigating a vehicle by means of a navigation algorithm arranged to determine spatial information on the basis firstly of inertial measurements coming from a signal processor circuit for processing the signals from an inertial measurement unit and secondly of pseudo-distance measurements determined in response to receiving signals from positioning satellites, the signal processor circuit having a calibration input adjustable on a self-calibration value in order to reduce the influence of an error of the inertial measurement unit on the spatial information supplied by the navigation algorithm,
  wherein the navigation algorithm implements at least one set of filters that are Kalman-Schmidt filters arranged to detect faulty measurements among the measurements that are transmitted to the set of filters and to prevent them from being used in determining the spatial information, and wherein the method comprises the steps of:
when a journey is completed:
transmitting the inertial measurements and the pseudo-distance measurements to at least one hybrid navigation filter that is a Kalman filter that is set to supply at least one estimate of at least one error term affecting the inertial measurement unit and of covariance associated with said estimate;
transmitting each estimate and the associated covariance to a consolidation algorithm programmed to compare the covariance with a first covariance threshold and to store the estimate if the covariance is less than the first covariance threshold; and
storing at least one parameter representative of a utilization condition of the aircraft; and after the journey has been completed:
using the consolidation algorithm to verify that the utilization condition is nominal, and where appropriate, updating the self-calibration value by means of the estimate of the error of the inertial measurement unit; and
calibrating the inertial measurement unit by using the updated self-calibration value, wherein the vehicle is an aircraft, and the spatial information comprises position, speed, attitude, and protection limit information, and wherein atmospheric pressure information is also transmitted to the set of filters and to the hybrid navigation filter.

\* \* \* \* \*